United States Patent [19]

McDaniel

[11] Patent Number: 4,489,172

[45] Date of Patent: Dec. 18, 1984

[54] ACTIVATED CHROMIUM CATALYST TREATED WITH TERTIARY ALCOHOL

[75] Inventor: Max P. McDaniel, Bartlesville, Okla.

[73] Assignee: Phillips Petroleum Company, Bartlesville, Okla.

[21] Appl. No.: 500,752

[22] Filed: Jun. 3, 1983

[51] Int. Cl.$^3$ .......................... B01J 21/06; B01J 21/36
[52] U.S. Cl. .................................... 502/239; 502/256
[58] Field of Search ........................ 502/172, 239, 256

[56] References Cited

U.S. PATENT DOCUMENTS

| 3,239,498 | 3/1966 | Witt | 502/256 X |
| 4,081,407 | 3/1978 | Short et al. | 423/335 X |
| 4,092,468 | 5/1978 | Gruber et al. | 526/105 |
| 4,247,421 | 1/1981 | McDaniel et al. | 502/256 X |

*Primary Examiner*—Carl F. Dees
*Attorney, Agent, or Firm*—French and Doescher

[57] ABSTRACT

A catalyst is produced by contacting an already activated silica-titania supported chromium composition with a tertiary alcohol and thereafter reactivating under relatively mild conditions. Such contacting is conveniently carried out by forming a slurry of the catalyst in an inert diluent containing a small amount of the alcohol.

25 Claims, No Drawings

ACTIVATED CHROMIUM CATALYST TREATED WITH TERTIARY ALCOHOL

BACKGROUND OF THE INVENTION

This invention relates to the activation of silica-titania supported chromium catalysts.

It has long been known to polymerize olefins utilizing a silica supported chromium catalyst. Relatively early in the development of this chromium catalyst technology, it was discovered that the presence of titanium in the support makes it possible to tailor a catalyst to produce a particular type of polymer. Over the years, many techniques have developed directed toward variation in the activation technique in order to produce a catalyst which will impart desired results in the finished polymer. A common factor in most of the techniques relating to chromium oelfin polymerization catalysts is that once the catalyst is activated it is given no further treatment but instead is rather carefully protected.

SUMMARY OF THE INVENTION

It is an object of this invention to provide a catalyst capable of giving high melt flow polymer;

It is a further object of this invention to provide a catalyst capable of giving a usable melt flow polymer at a relatively low polymerization temperature;

It is yet a further object of this invention to provide an improved activation process for chromium olefin polymerization catalysts; and It is still yet a further object of this invention to provide an improved olefin polymerization process.

In accordance with this invention, an activated chromium catalyst precursor on a silica-titania support is treated with a tertiary alcohol and then subjected to mild post treatment conditions.

DESCRIPTION OF THE PREFERRED EMBODIMENTS

The silica-titania support can be either a cogel or a titanium impregnated silica gel. Cogels produced by coprecipitating silica and titanium compounds are known in the art. Production of such cogels is disclosed in Dietz, U.S. Pat. No. 3,887,494 (June 3, 1975), the disclosure of which is hereby incorporated by reference. Cogels can be formed for instance by adding a titanium compound to a mineral acid, introducing an alkali metal silicate into the acid containing said titanium compound to form a hydrogel, aging the hydrogel for a time of greater than one hour, washing the thus aged hydrogel to produce a substantially alkali metal free hydrogel, forming a mixture comprising the thus washed hydrogel and a normally liquid oxygen-containing water soluble organic compound, and separating said organic compound and water from said mixture to form a xerogel. While this cogel base is broadly referred to as a silica cogel, it can contain 0.1 to 20 weight percent based on the total weight of the gel of other oxides, such as alumina, as is well known in the art. The titanium is present in the cogel in an amount within the range of 0.1 to 10, preferably 0.5 to 5 weight percent titanium based on the weight of the dried cogel (xerogel).

In the alternative embodiment, the silica-titania composition can simply by any known silica gel which has been impregnated either anhydrously or aqueously with a titanium compound. As with the cogel, the silica gel can contain 0.1 to 20 weight percent based on the total weight of the gel of other oxides, such as alumina, as is well known in the art. Exemplary of compounds suitable for aqueous impregnation are substituted or unsubstituted titanium acetylacetonates as disclosed in McDaniel, U.S. Pat. No. 4,294,724 (Oct. 13, 1981), the disclosure of which is hereby incorporated by reference. Exemplary of other compounds suitable for aqueous impregnation are alkanol amine titanates as disclosed in Hawley, U.S. Pat. No. 4,296,001 (Oct. 20, 1981), the disclosure of which is hereby incorporated by reference. Exemplary of the compounds which can be incorporated anhydrously, as for instance in an inert hydrocarbon diluent is tetraisopropyltitanate. Other anhydrous impregnations are disclosed in said McDaniel, U.S. Pat. No. 4,294,724 (Oct. 13, 1981), the disclosure of which is hereby incorporated by reference. Also a titanium compound such as $TiCl_4$ or tetraisopropyltitanate can be incorporated neat, for example, while the support is fluidized with an inert gas such as argon at moderate temperatures, e.g., 100° to 350° C. as described in U.S. Pat. No. 4,312,967, the disclosure of which is hereby incorporated by reference. As with the cogel, the titanium is present in an amount within the range of 0.1 to 10, preferably 1 to 6 weight percent titanium based on the weight of the dried gel (xerogel).

The chromium is present in an amount generally within the range of 0.001 to 10, preferably 0.1 to 5, more preferably about 0.5 to 1.2 weight percent based on the weight of the base (support), i.e., the dried or activated xerogel. The chromium compound can be incorporated as known in the art. For instance a hydrocarbon solution of a material such as tertiary-butyl chromate can be used to impregnate the xerogel or an aqueous solution of a chromium compound such as chromium trioxide or chromium acetate can be added to the hydrogel before drying or chromium can be coprecipitated along with the silica or coprecipitated along with the silica and titanium to produce a tergel initially. Anhydrous solutions of $\pi$-bonded organochromium compounds such as diarene chromium compounds (zerovalent) or bis-cyclopentadienylchromium(II) can also be used, the chromium converted at least predominantly to the hexavalent state on activation. The activation is carried out in a conventional manner using an oxygen-containing ambient such as air at temperatures in the range of 500° to 900° C., preferably 600° to 800° C. for a time of at least 5 minutes preferably 1 to 10 hours, more preferably 2 to 5 hours. Such treatment tends to convert the chromium to the hexavalent state, as well as to dry the catalyst base and to volatilize chromium which does not become bonded to the base.

Subsequent to the activation, the thus-activated chromium-containing silica-titania catalyst is treated with a tertiary alcohol. The treating time can vary from one minute or less to four hours or more, preferably from 30 minutes to 2 hours. The temperature can vary from room temperature or below to 100° C. or above. While applicant does not wish to be bound by theory, it is believed the benefical effect of this invention flows from the chromium compound dissolving in the alcohol and being redistributed on the catalyst surface. Apparently, the tertiary alcohols do not reduce the chromium as primary and secondary alcohols do.

Suitable tertiary alcohols include those containing from about 4–20, preferably from 4 to 8 carbon atoms. Specific examples include tertiary butyl alcohol (2-methyl-2-propanol), tertiary amyl alcohol (2-methyl-2- butanol), 2-methyl-2-pentanol, 3-ethyl-3-pentanol; 2,2,4-trimethyl-4-pentanol and mixtures.

Theoretically, the amount of alcohol used should be as nearly as possible to two molecules of alcohol per atom of chromium. Lower amounts, of course, would effect a proportionally smaller improvement and there might even be instances in which it would be desirable to have two forms of chromium on the substrate as would be the case where an insufficient amount of alcohol is used. However, as a general rule at least one molecule of alochol per atom of chromium is desired. The upper limit can be subject to substantial flexibility since, except for the possibility of great excesses of alcohol having a detrimental effect on the catalyst, the only effect of excess alcohol is simply the economic waste of the additional alcohol which will evaporate. However, it is preferred not to use more than 20 molecules of alcohol per atom of chromium. Thus preferably about 1 to about 10 molecules of alcohol per atom of chromium are used. For convenience, this can be expressed as moles alcohol to atoms Cr ratio of about 1:1 to 10:1.

The alcohol treatment is generally carried out in an inert diluent such as a normally liquid hydrocarbon. Suitable diluents are those described hereinafter as polymerization diluents, with n-hexane and n-pentane being preferred. The activated catalyst is simply slurried in the inert hydrocarbon diluent and the alcohol either incorporated therein prior to the slurry operation or added to the slurry. The amount of alcohol relative to the diluent will be very small in view of the relatively small amount of chromium present. Alternatively, the alcohol could be added neat by simply subjecting the activated catalyst to an appropriate amount of alcohol vapor.

After the treatment, the volatile alcohol and diluent are removed for instance by gentle and vacuum or by means of gentle heating in the absence of catalyst poison such as water and the thus-treated catalyst is subjected to a mild reoxidation (reactivation) in an oxygen containing ambient such as air at a temperature of 200° to 600° C., preferably 300° to 400° C. for a time of 1 minute to 10 hours preferably 15 minutes to 5 hours. The drying can be a part of the reoxidation step or a separate prior step.

The catalysts of this invention are suitable for the production of normally solid 1-olefin homopolymer and also for the production of predominantly ethylene copolymer using as the monomer predominantly ethylene. Ethylene can be copolymerized with one or more higher aliphatic mono-1-olefins containing 3 to about 10 carbon atoms per molecule such as propylene, 1-butene, 1-pentene, 1-hexene, 1-octene, and/or a conjugated diolefin containing 4 to about 12 carbon atoms in any proportion. Ethylene, propylene, 1-butene and 1-hexene are the most commonly used monomers. In such copolymers, the ethylene content generally ranges from about 97 to 99.6 weight percent which is obtained using from about 93 to 99.6 weight percent ethylene monomer, the remainder being said higher olefin comonomer. More broadly, ethylene copolymers can be made using 80 to 99.8 weight percent ethylene and 20 to 0.2 weight percent comonomer in the feed. Any other combination of the above described monomers, i.e., propylene/butene, butene/hexene can also be used in copolymerizations.

The polymerization process using the catalyst of this invention is conducted in the gaseous phase or in liquid phase, generally in the presence of an inert hydrocarbon diluent. Suitable diluents are those hydrocarbons having from 3 to 12 carbon atoms per molecule, generally selected from paraffins, cycloparaffins and aromatics with the paraffinic hydrocarbons being more preferred. Preffered diluents include propane, n-butane, isobutane, n-pentane, isopentane, n-hexane, n-heptane, 2,2,4-trimethylpentane, cyclopentane, cyclohexane, methylcyclohexane, n-dodecane and mixtures thereof. It is preferred to have one of the previously mentioned diluents present in the liquid phase to facilitate removal of the heat of reaction. The pressure is generally in the range of 0 to 2000 psig and need be no more than sufficient to maintain the diluent in liquid phase, i.e., 50 to 750 psig.

The polymerization reaction in accordance with this invention is generally carried out within the temperature range of 100° to 500° F. (38° to 260° C.). Most frequently, the range is from 150° to 350° F. (66° to 178° C.) since polymer yields are highest within this range. In a presently preferred embodiment, the temperature range is from 150° to 230° F. (66° to 110° C.) so that the polymer particles form a suspension in the reaction mixture, i.e., particle form process. At higher temperatures the polymer in most cases forms in solution in the diluent in the reaction zone, i.e., a solution process.

The contacting of monomer or monomers with the catalyst can be effected by any of the techniques known in the art of solid catalysis. A convenient method is to suspend the catalyst in the liquid diluent and to agitate the reaction mixture, thus maintaining the catalyst as a solid suspension in the liquid diluent. Other known catalytic contacting methods such as fixed bed, fluidized bed, gravitating bed, etc., can also be used. Reference to production of ethylene polymers according to particle form processes is found in U.S. Pat. No. 3,624,063, the disclosure of which is hereby incorporated by reference.

The particle-form process in which the catalyst of this present invention is particularly applicable is a process in which at least one olefin is polymerized at a temperature within the range of about 150° to 230° F. (66° to 110° C.) by means of the catalyst of the invention. The catalyst is maintained in suspension and is contacted with the olefin or mixture of olefins in an organic medium at pressures sufficient to maintain the medium and at least a portion of the olefins in the liquid phase. The medium and temperature are such that the polymer produced is insoluble in the medium and is recovered in the form of solid particles. The organic medium (diluent) is generally a paraffin and/or cycloparaffin having from 3 to 12 carbon atoms per molecule. Representative examples include propane, n-butane, isobutane, n-pentane, isopentane, cyclohexane, n-dodecane, methylcyclohexane and the like. Pressures can range from about 100 to 700 psig or higher, and catalyst concentrations can range from 0.001 to about 1 weight percent (including base) based on the weight of the reactor contents.

Hydrogen can be used to decrease the molecular weight of the polymers produced with the catalyst of this invention if desired (i.e., to give a much higher melt index), the catalyst of this invention being particularly sensitive to the beneficial effects of introducing hydrogen to control molecular weight. Partial pressure of hydrogen when hydrogen is used can be within the range of 5 to 100 psig, preferably 10 to 50 psig.

EXAMPLE 1

Cogel Catalysts

A series of catalysts was prepared from a silica-titania cogel hydrogel containing 5 weight percent titanium as titanium dioxide and 1 weight percent chromium as chromium acetate. The silica-titania cogel hydrogel was formed as disclosed in Dietz, U.S. Pat. No. 3,887,494 (June 3, 1975) by coprecipitation, aging, washing, impregnation with an aqueous solution of chromium acetate and drying by azeotropic distillation with ethyl acetate. The catalysts were activated for polymerization in 48 mm O.D. quartz tubes using a heat-up rate of 3° to 5° C. per minute and a dry air gas flow rate of about 40 liters per hour. Generally, 30 to 80 mL of dry catalyst was charged during each activation and each activation was conducted for about 4½ to 5 hours at 1400° F. (760° C.) with dry air under fluid bed conditions. The chromium acetate was converted into chromium oxide during the activation step. Catalyst made in this fashion is comparison catalyst A. It was activated for 5 hours at 1400° F. yielding an orange product.

Invention catalyst B was prepared from a portion of the above cogel after activation as before for 4½ hours in dry air. A sample weighing 6.5 g containing about 1.25 mmoles of Cr was impregnated with 0.5 mL (5.3 mmole) of t-butyl alcohol as a 2 weight percent solution in dry n-hexane. The initial orange color of the catalyst changed to yellow and a yellow solution above the catalyst also resulted. The solvent was evaporated and the dry mixture was calcined under fluid bed conditions in the manner described before. However, in this instance the invention catalyst was reactivated for 1 hour at 600° F. (316° C.) in dry air. The catalyst was tan-brown in color. The calculated t-butyl alcohol to Cr mole ratio was about 4.2.

Invention catalyst C was similar to B except that the reactivation step was carried out in dry air for 1 hour at 1000° F. (538° C.). The catalyst was orange in color after the alcohol treatment and reactivation.

A portion of each activated catalyst was tested for melt index behavior by polymerizing ethylene in a particle form process in a stainless steel reactor with about 567 g of isobutane as the diluent at a nominal reactor pressure of about 565 psia (3.89 MPa) to give yields of about 5000 g polymer per g catalyst. Melt index values in terms of g/10 minutes of the resulting ethylene homopolymers were determined in accordance with ASTM D 1238, Condition E which were corrected as needed based on known correlations between melt index (MI) and productivity. High load melt index (HLMI) was determined according to the above test method employing Condition F. The ratio, HLMI/MI, gives a measure of the molecular weight distribution of the polymer, the smaller the number the narrower the distribution. Higher HLMI/MI ratios indicate the polymers are better suited for uses as blow molding, for example.

The amount of catalyst employed in such run, the reactor temperature used and the results obtained are set forth in Table I.

TABLE I

| | | | | | Ethylene Polymerization, Cogel Catalysts | | |
|---|---|---|---|---|---|---|---|
| Run No. | Catalyst Type | Catalyst Wt. g | Reactor Temp., °C. | Polymer Yield, g | Productivity g polymer/ g cat. | Polymer MI | Polymer HLMI/MI |
| 1 | A[1] | 0.0431 | 107 | 207.0 | 4800 | 2.7 | 46 |
| 2 | B[2] | 0.0506 | 99–102 | 256.6 | 5070 | 2.4 | 80.9 |
| 3 | C[2] | 0.0582 | 104–107 | 279.2 | 4800 | 2.1 | 43.4 |

[1]Comparison catalyst, no t-butyl alcohol treatment.
[2]Invention catalysts, treated with t-butyl alcohol.

The results in Table I show that invention catalyst B produces ethylene polymer having a melt index of 2.4, similar to that of comparison catalyst A (2.7 MI) even at a reactor temperature ranging from 5° to 8° C. lower. The difference is significant since polymer melt index increases as the reactor temperature increases. Also, the polymer of run 2 has a much higher HLMI/MI ratio than the comparison polymer of run 1 and it would be expected to be superior for blow molding purposes.

The effect of the reactivation temperature of the t-butyl alcohol treated catalysts is shown in invention runs 2 and 3. That is, increasing the reactivation temperature from 600° F. (316° C.) for catalyst B to 1000° F. (538° C.) for catalyst C somewhat diminishes the melt index capability of the invention catalyst and it appears to be similar to that of comparison catalyst A, had both catalysts been run at the same temperature. However, the HLMI/MI ratio of 43.4 indicated that the primary effect obtained by increasing the reactivation temperature was a means of narrowing polymer molecular weight distribution. Thus some control over MWD is possible.

EXAMPLE 2

Titanated Silica Catalysts 100 mL of Davison 952 grade silica was calcined in dry air at 600° C. for 5 hours under fluid bed conditions. The recovered silica was soaked overnight in water to rehydrate it and the product dried for about 24 hours at about 110° C. in an air oven. The product was fluidized with argon at 150° C. while 5.0 mL of $TiCl_4$ was slowly added. Another 5 mL of $TiCl_4$ was slowly added, the temperature was slowly raised to 300° C. and held there for about 30 minutes under an argon stream to remove any unreacted $TiCl_4$. Titration of a portion of the treated silica with silver nitrate solution revealed a chloride concentration of 1.612 mmoles/g. The remaining treated silica was reactivated at 800° C. in dry air for 2 hours, then cooled and flushed with argon. Titration as above revealed that the product contained about 0.179 mmole chloride/g. The remaining product weighed 20.5 g. The titanium content of the silica is thought to remain about the same, now largely in the form of $TiO_2$.

To 20.5 g of the dry product was added 0.197 g of $CrO_3$ dissolved in 111.3 g of acetonitrile and the solvent was evaporated by gentle heating. The calculated amount of chromium added was 1.28 mmoles, giving the equivalent of about 0.5 weight percent Cr based on the dry composite. The product is comparison catalyst D. The catalyst was reactivated at 800° C. in oxygen for 2 hours.

A 13.5 g portion of catalyst D was slurried in dry n-pentane and to the slurry was added 6.4 mL of a 2 weight percent solution of t-butyl alcohol in n-pentane(1.35 mmoles of t-butyl alcohol). The mole ratio of t-butyl alcohol to chromium was calculated to be about 1.05:1.

The resulting invention Catalyst E was then flushed with nitrogen under fluid bed conditions until a temperature of 140° C. was reached, then activation was carried out for 2 hours at 300° C. in dry air.

A portion of each activated catalyst was then tested in ethylene polymerization as before, each run conducted at 102° C. to give an estimated productivity of about 3,000. The amount of catalyst employed in each run and the results obtained are given in Table II.

TABLE II

| | Ethylene Polymerization, Titanated Catalysts | | | | |
|---|---|---|---|---|---|
| Run No. | Catalyst Type | Polymer Wt. g | Productivity g polymer/ Yield, g g cat. | Polymer MI | HLMI/MI |
| 1 | D$^{(a)}$ | 0.1159 | 331 2860 | 0.22 | 98 |
| 2 | E$^{(b)}$ | 0.0910 | 120 1320 | 2.0 | (nd) |

$^{(a)}$Comparison catalyst, no t-butyl alcohol treatment.
$^{(b)}$Invention catalyst, treated with t-butyl alcohol.
(nd) Not determined.

At identical reactor conditions, the results in Table II demostrate that the melt index capability of the catalyst is dramatically increased from 0.2 to 2 by the t-butyl alcohol treatment. However, catalyst productivity is significantly lessened in this instance suggesting that the reactivation temperature of 300° C. employed is not at or near optimum in this particular instance. As reactivation temperature increases, productivity increases but melt index peaks, somewhere at or above about 350° C., hence the preference for 300° to 400° C. reactivation temperature although in some instances 350° to 500° C. reactivation temperature may be the preferred range.

EXAMPLE 3

Control, n-Butyl Alcohol 50 mL (about 10 g) of the 5 percent cogel catalyst of Example 1 was activated for 2 hours in air at 760° C. The cooled product was slurried in n-pentane and 0.5 mL (5.5 mmole) of n-butanol was added. The calculated n-butanol to Cr mole ratio was about 2.9:1. The n-pentane was evaporated and the catalyst was reactivated for 1 hour in dry air at 300° C.

A portion of the activated catalyst weighing 0.0483 g was used in ethylene polymerization under particle form conditions and a reactor temperature of 102° C. The run was conducted for 70 minutes but only 13 g of polymer was made. The calculated productivity amounted to only 269 g polymer per g catalyst.

This run shows that n-butanol-treated catalyst is not equivalent to a t-butyl alcohol treatment.

EXAMPLE 4

Control Using Triphenyl Silanol

Into a flask was introduced 9.2 g of a silica having a pore volume of 3.1 cc/g and a surface area of 300 m$^2$/g. Enough dry pentane was added to slurry the silica, and then 4.6 ml of titanium isopropylate was added (that is, 8 wt % Ti). The pentane was evaporated over a hot plate and the resultant impregnated support was calcined in air at 750° C. for 3 hours giving a white silica-titania. Next the support was slurried in pentane to which enough dicumene Cr(O) was added to yield a catalyst containing 0.75 wt % Cr. After the pentane had been evaporated, the catalyst was again calcined in air, this time at 800° C. for 2 hours, converting all the Cr to the hexavalent form.

The catalyst was tested for polymerization activity when 0.0510 g was added to a stirred, high pressure autoclave containing 1 liter of isobutane diluent. At 95° C. ethylene was supplied on demand for 52 minutes, during which time 115 g of polyethylene was produced, for a productivity of 2250 g/g. It was found to have a melt index of 1.75 g/10 min.

A 1.5 portion of this catalyst was then slurried in dry toluene in which 0.358 g of triphenyl silanol was dissolved, that is, 6 moles/mole Cr. The hexavalent Cr on the catalyst did not dissolve into the toluene, even when the solution was heated to boiling. The solvent was evaporated off and the catalyst was again calcined, this time at 500° C. for 1.5 hours in air. It was orange, indicating Cr(+6).

This catalyst was then tested under the same conditions that its parent had been. It made 112 g of polymer (2370 g/g) in 74 minutes, having a melt index of only 0.17 g/10 min. Thus triphenyl silanol was ineffective.

While this invention has been described in detail for the purpose of illustration, it is not to be construed as limited thereby but is intended to cover all changes and modifications within the spirit and scope thereof.

I claim:
1. A process for producing a catalyst comprising:
   contacting an activated silica-titania supported chromium catalyst precursor with a tertiary alcohol; and
   reactivating the resulting treated catalyst in an oxygen-containing ambient at a temperature within the range of 200° C. to 600° C.
2. A method according to claim 1 wherein said activated silica-titania supported catalyst precursor is produced by calcining in air at 500° C. to 900° C.
3. A method according to claim 2 wherein said calcining is carried out at 600° C. to 800° C.
4. A method according to claim 1 wherein the support of said silica-titania supported catalyst precursor has from 0.1 to 10 weight percent titanium based on the weight of said support.
5. A method according to claim 4 wherein said titanium is present in an amount within the range of 1to 6 weight percent titanium based on the weight of said support.
6. A method according to claim 1 wherein the support of said silica-titania supported catalyst precursor is a silica-titania cogel.
7. A method according to claim 1 wherein the support of said silica-titania supported catalyst precursor is produced by impregnation of silica gel with a titanium compound.
8. A method according to claim 7 wherein said impregnation is carried out under aqueous conditions.
9. A method according to claim 7 wherein said impregnation is carried out anhydrously.
10. A method according to claim 1 wherein said reactivating is carried out in air.
11. A method according to claim 10 wherein said reactivating is carried out at a temperature of 300° C. to 400° C. for a time within the range of 15 minutes to 5 hours.
12. A method according to claim 1 wherein said tertiary alcohol is one of tertiary butanol, tertiary amyl alcohol, 2-methyl-2-pentanol, 3-ethyl-3-pentanol, 2,2,4-trimethyl-4-pentanol and mixtures thereof.

13. A method according to claim 12 wherein said tertiary alcohol is tertiary-butanol.

14. A method according to claim 1 wherein said contacting is carried out for a time within the range of one minute to four hours.

15. A method according to claim 14 wherein said time is within the range of 30 minutes to 2 hours.

16. A method according to claim 15 wherein said tertiary alcohol is used in an amount within the range of one molecule of alcohol per atom of chromium to 10 molecules of alcohol per atom of chromium.

17. A method according to claim 1 wherein said tertiary alcohol is used in an amount within the range of 1 molecule of alcohol per atom of chromium to 10 molecules of alcohol per atom of chromium.

18. A method according to claim 1 wherein said contacting is done by forming a slurry of said silica-titania supported chromium catalyst precursor in an inert diluent containing said tertiary alcohol.

19. A method according to claim 18 wherein said diluent is a hydrocarbon containing from about 3 to about 12 carbon atoms.

20. A method according to claim 19 wherein said hydrocarbon is n-pentane or n-hexane.

21. A method according to claim 1 wherein said chromium is present in an amount within the range of 0.1 to 5 weight percent based on the weight of the support of said silica-titania supported chromium catalyst precursor.

22. A method according to claim 21 wherein said chromium is present in an amount within the range of 0.5 to 1.2 weight percent based on the weight of the support of said silica-titania supported chromium catalyst precursor.

23. A method according to claim 1 wherein said contacting is done by slurrying said silica-titania supported chromium catalyst precursor in an inert diluent containing said tertiary alcohol, said tertiary alcohol is present in an amount within the range of 1 molecule of alcohol per atom of chromium to 10 molecules of alcohol per atom of chromium, said contacting is carried out for a time of one minute to 4 hours; wherein said tertiary alcohol is selected from tertiary butanol, tertiary amyl alcohol, 2-methyl-2-pentanol, 3-ethyl-3-pentanol, 2,2,4-trimethyl-4-pentanol and mixtures thereof, wherein said reactivating is carried out at a temperature of 300° C. to 400° C. in air and said activated silica-titania supported chromium catalyst precursor is produced by calcination in air at a temperature of 600° C. to 800° C. and wherein titanium is present in the support of said silica-titania supported chromium catalyst precursor in an amount within the range of 0.5 to 5 weight percent based on the weight of said support.

24. A catalyst produced by the method of claim 23.

25. A catalyst produced by the method of claim 1.

* * * * *